US005770283A

United States Patent [19]

Gosselin et al.

[11] Patent Number: 5,770,283

[45] Date of Patent: Jun. 23, 1998

[54] TAMPER-INDICATING LABEL

[75] Inventors: Raymond R. Gosselin, Stillwater; John A. Spevacek, Woodbury, both of Minn.

[73] Assignee: Minnesota Mining and Manufacturing Company, St. Paul, Minn.

[21] Appl. No.: 705,038

[22] Filed: Aug. 29, 1996

Related U.S. Application Data

[63] Continuation of Ser. No. 146,615, Nov. 2, 1993, abandoned.

[51] Int. Cl.[6] .......... B32B 7/10

[52] U.S. Cl. .......... 428/35.7; 428/41.9; 428/42.1; 428/43; 428/195; 428/201; 428/214; 428/915; 428/916; 40/299; 206/807; 283/81; 283/101; 283/108

[58] Field of Search .......... 428/40, 916, 915, 428/36.9, 36.91, 36.92, 43, 40.1, 41.7, 41.8, 41.9, 214, 42.1, 195, 201, 41.1, 35.7; 40/299; 283/108, 109, 110, 81, 101; 206/807

[56] References Cited

U.S. PATENT DOCUMENTS

| | | | |
|---|---|---|---|
| Re. 24,906 | 12/1960 | Ulrich | 206/59 |
| 1,003,443 | 9/1911 | Erickson | 283/103 |
| 2,181,252 | 11/1939 | Vogel | 229/80 |
| 3,239,478 | 3/1966 | Harlan, Jr. | 260/27 |
| 3,487,567 | 1/1970 | Waybright | 40/22 |
| 3,631,617 | 1/1972 | Pekko et al. | 40/2.2 |
| 3,801,183 | 4/1974 | Sevelin et al. | 350/105 |
| 3,802,724 | 4/1974 | Gosnell | 283/9 |
| 3,864,855 | 2/1975 | Pekko et al. | 40/2 |
| 3,891,242 | 6/1975 | Arnold et al. | 283/6 |
| 3,923,198 | 12/1975 | Brochman | 220/359 |
| 3,925,584 | 12/1975 | Suzuki et al. | 428/40 |

(List continued on next page.)

FOREIGN PATENT DOCUMENTS

| | | | |
|---|---|---|---|
| 0 000 401 | 1/1979 | European Pat. Off. | F24D 9/02 |
| 0 396 428 | 11/1990 | European Pat. Off. | B65D 33/34 |
| 0 491 099 A1 | 6/1992 | European Pat. Off. . | |
| 2 451 081 | 10/1980 | France | G06F 3/10 |
| 2 597 405 A1 | 10/1987 | France . | |
| 25 11 367 | 10/1975 | Germany | B44F 1/12 |
| 28 03 434 | 8/1979 | Germany | C09J 7/02 |
| 29 52 322 | 7/1981 | Germany | B55F 1/12 |
| 2 173 150 | 10/1986 | United Kingdom | B32B 7/06 |
| 2 200 337 | 8/1988 | United Kingdom | B65D 33/34 |

OTHER PUBLICATIONS

Product Literature entitled "Technical Report—The Label Component System Process Guide" of 3M Identification and Converter Systems Division, No. 70–0703–5364–7(81.5)R1 (1991).

"Do Marketeers Miss the Tremendous Capabilities of Embossed Holograms?"; Paper & Kunststoff Verarbeiter (dated 1986).

K.J. Schell; "White light holograms for credit cards"; SPIE vol. 523 Applications of Holography, pp. 331–335 (dated 1985).

Lacoste; "Using Embossed Holography to Enhance Package Appeal"; 1987 Polymers, Laminations and Coatings Conference; pp. 285–287.

(List continued on next page.)

*Primary Examiner*—Rena Dye

*Attorney, Agent, or Firm*—Peter L. Olsen; James J. Trussell; Leland D. Schultz

[57] ABSTRACT

A tamper-indicating label which includes (i) light-transmissive facestock, (ii) a light-transmissive imaged release coating covering a portion of the facestock so as to provide indicia, (iii) a contrast enhancement coating over the release coated surface of the facestock, and (iv) an adhesive coated upon the contrast enhancement layer where the indicia provided by the release coating is not visible until the facestock is forcibly separated from the release coating after which the indicia becomes permanently visible and the label is provided with sufficient assembly cohesive strength to keep the label together as a single unit after the facestock is separated from the release coating and the indicia is rendered visually perceptible.

28 Claims, 3 Drawing Sheets

U.S. PATENT DOCUMENTS

| | | | |
|---|---|---|---|
| 3,933,304 | 1/1976 | Judd | 229/62 |
| 3,935,960 | 2/1976 | Cornell | 220/260 |
| 4,028,165 | 6/1977 | Rosenfeld | 156/234 |
| 4,068,028 | 1/1978 | Samonides | 428/40 |
| 4,082,873 | 4/1978 | Williams | 428/40 |
| 4,121,003 | 10/1978 | Williams | 428/40 |
| 4,180,929 | 1/1980 | Schultz, Jr. | 40/2.2 |
| 4,184,701 | 1/1980 | Franklin et al. | 283/9 |
| 4,246,307 | 1/1981 | Trautwein | 428/43 |
| 4,475,661 | 10/1984 | Griffin | 215/366 |
| 4,505,399 | 3/1985 | Weiner | 215/230 |
| 4,557,505 | 12/1985 | Schaefer et al. | 283/81 |
| 4,588,465 | 5/1986 | Paciorek | 156/220 |
| 4,608,288 | 8/1986 | Spindler | 428/78 |
| 4,627,642 | 12/1986 | Peronneau et al. | 283/92 |
| 4,630,891 | 12/1986 | Li | 350/105 |
| 4,652,473 | 3/1987 | Han | 428/35 |
| 4,653,113 | 3/1987 | Taylor | 383/5 |
| 4,684,554 | 8/1987 | Ou-Yang | 428/35 |
| 4,709,396 | 11/1987 | Voshall et al. | 383/5 |
| 4,709,397 | 11/1987 | Voshall et al. | 383/5 |
| 4,717,615 | 1/1988 | Reinhart | 428/161 |
| 4,718,553 | 1/1988 | Adamoli et al. | 206/459 |
| 4,721,217 | 1/1988 | Phillips et al. | 215/230 |
| 4,721,638 | 1/1988 | Matsuguchi et al. | 428/40 |
| 4,728,377 | 3/1988 | Gallagher | 156/58 |
| 4,737,559 | 4/1988 | Kellen et al. | 526/291 |
| 4,746,556 | 5/1988 | Matsuguchi et al. | 428/40 |
| 4,747,620 | 5/1988 | Kay et al. | 283/86 |
| 4,760,919 | 8/1988 | Pereyra | 206/484.2 |
| 4,763,931 | 8/1988 | Matsuguchi et al. | 283/108 |
| 4,772,650 | 9/1988 | Ou-Yang | 524/271 |
| 4,773,677 | 9/1988 | Plasse | 283/77 |
| 4,804,096 | 2/1989 | Harding | 215/228 |
| 4,837,061 | 6/1989 | Smits et al. | 428/40 |
| 4,838,708 | 6/1989 | Holcomb et al. | 383/5 |
| 4,856,857 | 8/1989 | Takeuchi et al. | 350/3.6 |
| 4,876,123 | 10/1989 | Rivera et al. | 428/34.2 |
| 4,908,285 | 3/1990 | Kushibiki et al. | 430/1 |
| 4,913,504 | 4/1990 | Gallagher | 350/3.6 |
| 4,915,994 | 4/1990 | Begelfer et al. | 428/40 |
| 4,937,040 | 6/1990 | Holcomb et al. | 383/5 |
| 4,941,196 | 7/1990 | Edelman et al. | 383/5 |
| 4,972,953 | 11/1990 | Friedman et al. | 206/459 |
| 4,980,222 | 12/1990 | Rivera et al. | 428/195 |
| 4,988,547 | 1/1991 | Voto, Jr. et al. | 428/35.2 |
| 4,998,666 | 3/1991 | Ewan | 229/102 |
| 5,008,139 | 4/1991 | Ochi et al. | 428/40 |
| 5,015,318 | 5/1991 | Smits et al. | 156/233 |
| 5,080,463 | 1/1992 | Faykish et al. | 359/536 |
| 5,082,702 | 1/1992 | Alband | 428/40 |
| 5,104,719 | 4/1992 | Kamen et al. | 428/40 |
| 5,153,042 | 10/1992 | Indrelie | 428/40 |
| 5,169,707 | 12/1992 | Faykish et al. | 428/195 |
| 5,277,971 | 1/1994 | Weng et al. | 428/343 |
| 5,294,470 | 3/1994 | Ewan | 428/40 |
| 5,319,475 | 6/1994 | Kay et al. | 359/2 |
| 5,346,259 | 9/1994 | Mocilnikar et al. | 283/108 |
| 5,358,281 | 10/1994 | Greig | 283/81 |
| 5,405,692 | 4/1995 | Weng et al. | 428/343 |

OTHER PUBLICATIONS

Meade; "Rainbows at Work—Holographic Substrates"; Screen Printing; vol. 75, No. 1, Jan. 1985; pp. 50, 52, 53A.

Mann; "Holographic Advances Open New Dimensions For Converters"; Paper, Film & Foil Converter; Jul. 1986; pp. 36–38.

Labels & Labelling: Hologram labelling, Packaging Week p. 241, Sep. 10, 1986.

Brochure entitled "Scotch™ Protected Graphics Systems"; Converter Specialties Division/3M; Form No. 70–0701–7040–5(126.5)R1 CRD 168A (undated).

Brochure entitled "Tamper Resistant Packaging from 3M"; 3M Tamper Resistant Packaging Center/3M; (undated).

Brochure entitled "SecurMark™ Labeling Systems—Built in Destruct Pattern Clearly Indicates Tampering"; 3M Converter Specialties Division; Form No. 70–0702–2444–0 (undated).

Brochure entitled "SecurMark™ Computer Imprintable Labeling System"; 3M Converter Specialties Division; Form No. 70–0702–7605–3(79.5)ii (undated).

Brochure entitled "Labeling Component Systems—Create Your Own Customized Tamper–Indicating Labels With Scotch™ Brand Label Components"; 3M Converter Specialties Division; Form No. 70–0702–7690–5(30.5)ii (undated).

"Structural ideas enhance pressure–sensitive labeling"; Nov. 1983/Packaging Holographic Films by Anon, Food Drug Packag. vol. 50, No. 3, Mar. 1986, p. 58.

3M, Turn Your Label Into A Security System, 3M Bulletin No. 70–0703–5359–7, 3M 1991.

3M, Scotch Label Component System, 3M Bulletin No. 70–0704–8194–3 (23.3).

3M, The Label Component System Process Guide, 3M Bulletin No. 70–0703–5364–7(81.5), 3M 1991.

TAMPER-INDICATING LABEL

This is continuation of application Ser. No. 08/146,615 filed Nov. 2, 1993 which is now abandoned.

FIELD OF THE INVENTION

The invention relates to tamper-indicating labels. More specifically, the invention relates to tamper-indicating pressure sensitive labels which irreversibly display an image after removal from a substrate to which it has been adhesively applied.

BACKGROUND OF THE INVENTION

A variety of tamper-indicating labels have been developed for providing visual evidence that the label has been completely or partially separated from the container so as to provide access to the container. A number of tamper-indicating labels are known including those described in U.S. Pat. Nos. 3,631,617; 4,121,003; 4,180,929; 4,588,465; 4,652,473; 4,684,554; 4,746,556; 4,763,931; 4,772,650; 4,876,123 and 4,980,222. One of the more successful tamper-indicating labels is disclosed in U.S. Pat. No. 5,153,042 issued to Indrelie and assigned to the Minnesota Mining and Manufacturing Company of St. Paul, Minn. Briefly, the tamper-indicating label of Indrelie includes an imaged layer of a release coating positioned between layers of transparent facestock and frangible metal whereby removal of the applied label separates the metal layer between a residual image—defined by the image of the release coating—left on the substrate and a negative of the image appearing on the facestock removed from the substrate. Efforts to conceal tampering by realigning the label are prevented by the loss of intimate contact between the layers of the label after separation.

Tamper-indicating labels—available from the Minnesota Mining and Manufacturing Company of St. Paul, Minn. under the trademark SCOTCHMARK™ (product numbers. 7381 and 7384)—possess the attribute of leaving a tenaciously adhered residual message of tampering on the substrate. This attribute is highly desired whenever evidence of tampering is wanted on the substrate. However, in some situations it is desirable to have a label which displays permanent evidence of tampering when any attempt is made to remove it from a substrate but does not leave any residue on the substrate upon removal. Optionally, the label would leave a residue upon removal but the residue is easily removable without the use of solvents. Tampering or unauthorized entry is evidenced by either activation of the tamper-indicating image on the label or a complete absence of the label.

Such fully-removable tamper-indicating labels could be useful as window stickers permitting entry to state parks, window stickers evidencing emissions testing of an automobile, or a sealing label applied to such things as a file cabinet, a brief case, a standard door, an aircraft hanger door, the access door of an aircraft, or the trunk of a vehicle, so as to indicate or deter unauthorized entry. By way of example, when used as a sealing label on the trunk of a vehicle the label would be applied so that it overlaps the tail light and the trunk door to deter the theft of items such as wheel covers, floor mats, jacks, and the like from the trunk during storage at the factory and transportation from the factory to the dealership.

Tamper-indicating labels of the prior art are designed to leave part of the label tenaciously adhered to the substrate. Removal of the residue requires the use of an environmentally undesirable hydrocarbon solvent and/or requires the use of additional tools, such as a mechanical scraper, both of which are prone to damage the substrate.

Accordingly, a substantial need still exists for a tamper-indicating label which can reliably provide visual evidence that a container has been opened without leaving a residual message on the substrate. In addition, the label should not predestruct (i.e., display the tamper-indicating message before the label has been removed from the substrate, such as upon removal from the liner) and the tamper-indicating message should be both easy to read once the label has been removed—regardless of the means employed to remove the label—and remain visible despite surreptitious efforts to conceal tampering by reapplying the label.

SUMMARY OF THE INVENTION

We have discovered a tamper-indicating label which includes (i) a layer of light-transmissive facestock, (ii) a layer of light-transmissive imaged release coating adjacent the facestock so as to provide indicia, and (iii) an adhesive adjacent the release coating.

The indicia provided by the release coating is not visible until the release coating is forcibly separated from one of the other layers to which it is laminated. Upon separation, the indicia created by the imaged release layer becomes permanently visible and the label is "activated".

In a first embodiment, the label is provided with sufficient assembly cohesive strength to keep the label together as a single unit after "activation".

In a second embodiment, the label does not possess sufficient assembly cohesive strength to routinely keep the label together as a single unit after "activation" but the adhesive permits visually complete removal of any residual label fragments remaining on the substrate after removal of the label without the use of an organic solvent.

The label preferably includes a contrast enhancement coating between the release coated surface of the facestock and the adhesive for increasing visual perceptibility of the indicia.

In order to provide a succinct and meaningful description of the invention, the remainder of this specification will be based upon a tamper-indicating label which includes the specific sequence of facestock, release coating, contrast enhancement layer and adhesive. In addition, the remainder of the specification will be based upon separation of the release coating from the facestock side of the label rather than the adhesive side of the label. These limitations are provided solely to facilitate disclosure of the invention are not intended to restrict the scope of the invention.

The combination of controlled visual perceptibility of the indicia and assembly cohesiveness of the label are based upon a combination of (i) the adhesive strength between the facestock and the release coating being less than the adhesive strength between the facestock and the contrast enhancement coating, (ii) the adhesive strength between the facestock and the contrast enhancement coating being greater than the adhesive strength between the pressure-sensitive adhesive and a substrate to which the label is applied, (iii) the adhesive strength between the pressure-sensitive adhesive and a substrate to which the label is applied being greater than the adhesive strength between the facestock and the release coating, and (iv) the assembly cohesive strength of the label being greater than the adhesive strength between the pressure-sensitive adhesive and a substrate to which the label is applied.

The tamper-indicating label is particularly well adapted for a broad range of uses including specifically, but not exclusively, tamper-indicating closure seals for brief cases, computer disc drives, doors, and filing cabinets; and tamper-indicating display labels evidencing payment for entry into a park or passage of mandated emission testing.

DETAILED DESCRIPTION OF THE INVENTION INCLUDING A BEST MODE

Nomenclature

Figure 1:
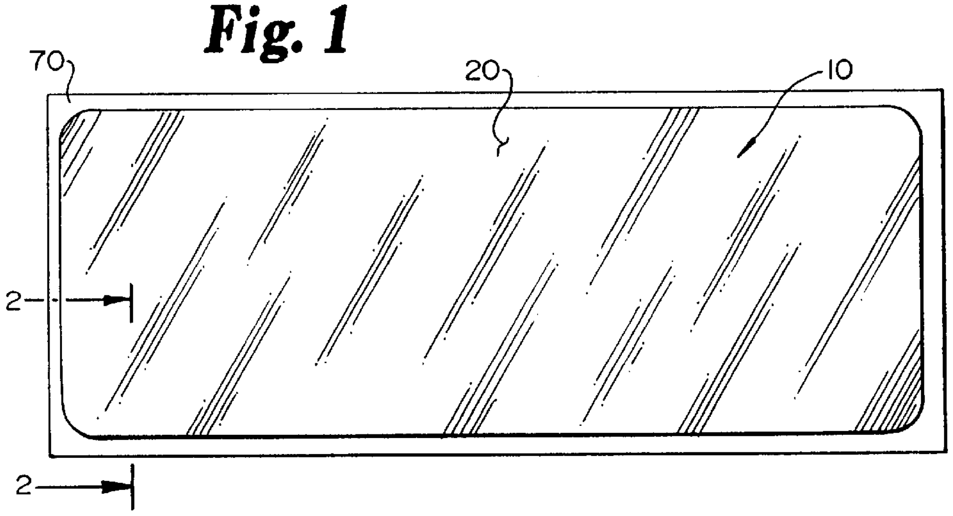
FIG. 1 is a top view of one embodiment of the invention.
Figure 2:
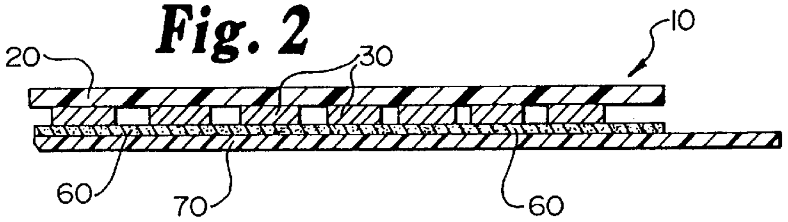
FIG. 2 is a cross-sectional side view of the invention depicted in FIG. 1 prior to removal of the release liner.
Figure 3:
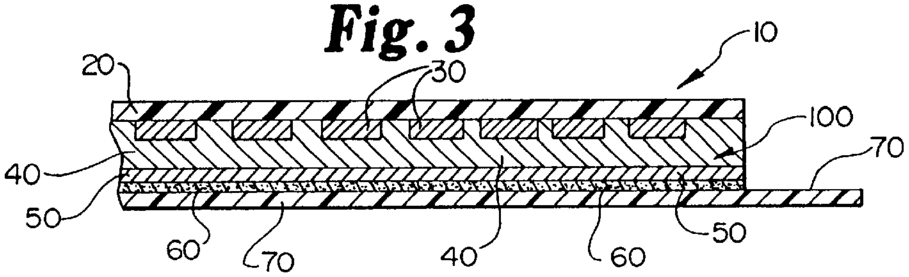
FIG. 3 is a cross-sectional side view of a second embodiment of the invention prior to removal of the release liner.
Figure 4:
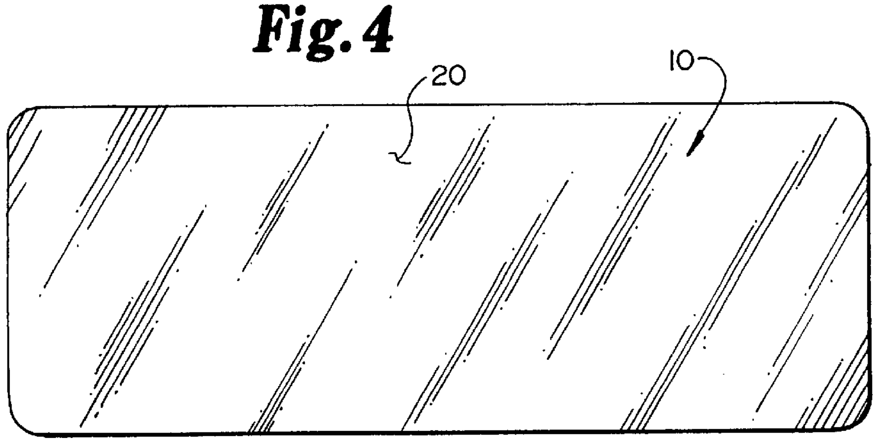
FIG. 4 is a top view of the invention depicted in FIG. 3 after removal of the release liner.
Figure 5:
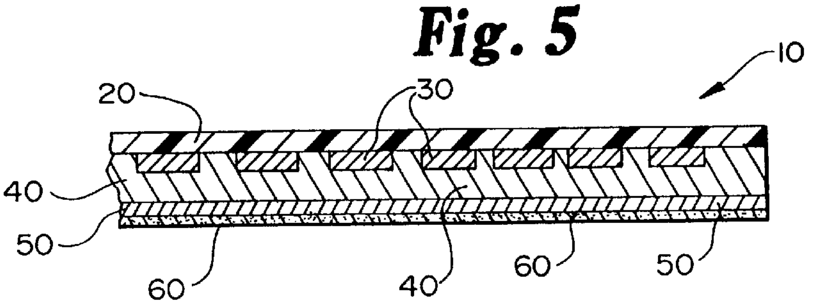
FIG. 5 is a cross-sectional side view of the invention depicted in FIG. 4.
Figure 6:
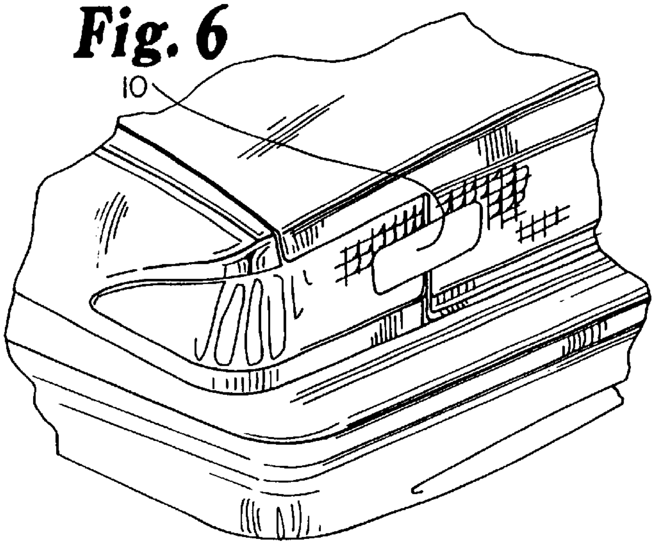
FIG. 6 is a top view of the invention depicted in FIG. 3 applied to the tail light and trunk of a vehicle for purposes of indicating whether the trunk has been opened since application of the label.

10 Tamper-Indicating Label
20 FaceStock
30 Release Coating
40 Primer Coating
50 Contrast Enhancement Coating
60 Pressure Sensitive Adhesive
70 Release Liner
100 Substrate Definitions As used herein, including the claims, the term "activation", when used to describe the condition of the label 10, means separation of the contrast enhancement coating 50 from the facestock 20 in those areas treated with release coating 30 so that the label 10 displays the image defined by the release coating 30 layer and provides visual identification that the label 10 has been peeled or otherwise removed from the substrate 100.

As used herein, including the claims, the term "adhesive" means the macroscopically observable attraction between dissimilar substances such as the attraction between the facestock 20 and the release coating 30 layers in the tamper-indicating label 10 of this invention and the attraction between the pressure sensitive adhesive 60 on the label 10-and a substrate 100 to which the label 10 has been applied.

As used herein, including the claims, the term "cohesive" means the macroscopically observable mutual attraction by which the elements of a body remain together such as the mutual attraction of the various layers in the tamper-indicating label 10 which contribute to the unitary constitution of the label 10 ("assembly cohesiveness") and the mutual attraction between the molecular elements within a single layer which contribute to a tendency of the layer to remain together as a single body ("individual cohesiveness").

As used herein, including the claims, the term "facestock" refers to a layer of material which provides the primary structural integrity to a label 10. The facestock 20 is generally the base layer which is treated with other layers to create the label 10. One composition commonly used as a facestock 20 is a film of polyethylene terephthalate.

As used herein, including the claims, the term "light transmissive" refers to the property of transmitting sufficient light that an image can be seen therethrough with the unaided eye. Light transmissive includes specifically, but not exclusively, transparent and translucent.

Composition

The label 10 includes at least a facestock, a release coating and a pressure sensitive adhesive. Other layers can be positioned between the facestock and the release coating or the release coating and the pressure sensitive adhesive. In a preferred embodiment, the label 10 includes sequential layers of facestock 20, release coating 30, optional primer coating 40, optional contrast enhancement coating 50, pressure sensitive adhesive 60 and optional release liner 70. Alternatively, the sequence may be altered by repositioning the optional primer coating 40 between the facestock 20 and the release coating 30 or between the contrast enhancement coating 50 and the pressure-sensitive adhesive 60.

As mentioned in the SUMMARY of this specification, the remainder of this specification will be based upon a tamper-indicating label 10 which includes the specific sequence of facestock 20, release coating 30, contrast enhancement coating 50 and adhesive 60 wherein the release coating 30 separates from the facestock 20 side of the label 10 rather than the adhesive 60 side of the label 10. Again, these limitations are provided solely to permit a concise and meaningful disclosure of the invention and are not intended to unduly restrict the scope of the invention.

Proper activation of the tamper-indicating label 10 requires cooperative interaction between the individual components of the label 10. Consequently, the components should be selected together with proper consideration given to the interactive contribution provided by the components. For example, selection of the facestock 20 should include a consideration of the adhesive strength between the facestock 20 and release coating 30 relative to the adhesive strength between the other layers of the label 10 so that proper activation of the label 10 is achieved. In addition, other factors may affect performance of the label 10 including the relative surface areas of the facestock 20 which are coated with the release coating 30 and the primer coating 40.

FaceStock

The facestock 20 is preferably a light transmissive, polymeric film possessing sufficient strength and durability. The facestock 20 contributes, most of the structural integrity of the label 10 and should maintain its light-transmissiveness during normal use and abuse of the label 10. In a preferred embodiment, the label 10 should be sufficiently flexible to conform to the irregular surfaces of the substrate 100 to which it is applied. When intended, for use on a clear substrate 100, such as a window pane, an opaque facestock 20 may be employed so that the label 10 may be readily located.

A preferred facestock 20—because of its toughness, durability, moisture resistance, dimensional stability and superior transparency—is biaxially oriented polyethylene terephthalate. Other suitable facestock 20 materials include cellulose acetate, polycarbonate, polyethylene, polystyrene, polyvinyl chloride and other polyolefins.

Release Coating

The release coating 30 may be any material which adhesively bonds to the facestock 20 with a strength which is significantly less than the adhesive strength with which the next layer of material (such as the primer coating 40 layer) adhesively bonds to the facestock 20 and provides a clearly visible message—relative to any visual display provided on the unactivated label 10—once separated from the primer coating 40. However, the adhesive strength with which the release coating 30 bonds to the facestock 20 should be sufficient to prevent premature activation of the label 10, such as removal of the label 10 from the release liner 70.

Typical release coatings 30 are generally capable of providing the desired reduction in adhesiveness at a thickness of about 100 to 300 nm.

Materials suitable as a release coating 30 include fluorinated chemicals, polyvinyl alcohols, silicones and waxes. The release coating 30 is conveniently applied in a solvent system such as a solution of polyvinyl alcohol in a co-solvent system of isopropanol and deionized water.

Particularly suitable materials for use as the release coating 30 are commercially available from Minnesota. Mining and Manufacturing Company of St. Paul, Minn. under the trademarks SCOTCHN™ Y-110 and Y-112. The SCOTCH™ Y-110 and Y-112 release coatings 30 may be conveniently applied when thinned with a co-solvent system of 75 vol % water and 25 vol % isopropyl alcohol. Such thinned solutions of SCOTCHM™ Y-110 and Y-112 release coatings 30 have a #2 Zahn-cup viscosity of about 20–25 seconds @ 32° C.

Primer Coating

The optional primer coating 40 is employed to provide a strong adhesive bond between the facestock 20 and the contrast enhancement coating 50 of the label 10. In those situations where the particular facestock 20 and contrast enhancement coating 50 possess a strong natural adherence to one another, the primer coating 40 may be eliminated.

Commensurate with its intended function, suitable primer coating 40 materials are those materials which are capable of providing a strong adhesive bond to both the facestock 20 and the contrast enhancement coating 50 material. Hence, selection of an acceptable coating material depends upon the specific facestock 20 and contrast enhancement coating 50 materials used in the label 10.

Particularly suitable materials for use as the primer coating 40 when the contrast enhancement coating 50 is vapor deposited metal include SCOTCHM™ Y-120 available from the Minnesota Mining and Manufacturing Company of St. Paul, Minn. and SURFLEX-LA™ Varnish available from Del-Val Ink and Color Co. of Riverton, N.J.

The thickness of the primer coating 40 should be sufficient to cover the imaged release layer 30 and provide a continuous surface to which the contrast enhancement coating 50 can be applied. Insufficient coating tends to produce undesirable ghost images on the label 10. Generally, a coating thickness of about four to six times the thickness of the release coating 30 is effective for providing the desired coverage.

Contrast Enhancement Coating

The optional contrast enhancement coating 50 is incorporated into the label 10 to enhance visual perceptibility of the tamper-indicating message on the label 10. The contrast enhancement coating 50 provides a clearly visible image once the contrast enhancement coating 50 has been separated from the facestock 20. This attribute permits the contrast enhancement coating 50 to prominently display the image defined by the release coating 30 after the label 10 has been activated.

Any material capable of providing such a contrasting visual appearance may be used as the contrast enhancement coating 50. Suitable contrast enhancement coating 50 materials include pigmented coatings, dyes, toners and vapor deposited metals.

Particularly suitable contrast enhancement coating 50 materials are the highly reflective metals of aluminum, copper, gold, iron, silver, zinc, etc. Thin frangible coatings of such metals may be readily applied to the label 10 by standard vapor deposition techniques. The vapor coated metal may optionally be oxidized during deposition.

When the contrast enhancement coating 50 is metal, the thickness of the coating is preferably sufficient to reduce light transmission through the contrast enhancement coating 50 to less than 2%, preferably less than 1%. By way of example, a 10 to 25 nm thick coating of vapor deposited aluminum is typically effective for achieving the desired properties. A thickness providing a light transmission of greater than about 2% tends to provide an inadequate visual contrast.

Method of Manufacture

Facestock 20 may be flexographically printed with a release coating 30, such as the co-solvent thinned SCOTCH™ Y-110 solution. The release coating 30 is printed to provide indicia upon the facestock 20. One example of suitable indicia—shown in FIG. 7—is a repeating pattern of the word VOID where the word is about 4 mm high and 10 mm long with an approximately 5 mm horizontal gap between words and an approximately 7 mm vertical spacing—measured center-to-center—between rows of words. In the example shown in FIG. 7, the release coating 30 covers approximately 30% of the facestock 20 surface area.

The printed release coating 30 is dried by conventional means, such as a jet dryer, to form a dried coating about 200 nm in thickness.

A primer solution, such as SCOTCH™ Y-120, may then be flood coated over the release-coated facestock 20 and dried by conventional means, such as a jet dryer, to form a dried coating which forms a relatively continuous planar surface over the release coated surface of the facestock 20 with a coating thickness of about 700 nm over those areas containing release coating 30 and about 900 nm over those areas void of release coating 30.

The dried primer-coated facestock 20 can then be rolled into a "jumbo" roll for transportation to a separate location for application of a contrast enhancement coating 50, such as a vapor deposited layer of metal.

By way of example, the jumbo roll of primer-coated facestock 20 may be fed at about 200 feet/minute (61 meters/minute) through the heated vacuum chamber of a vapor coater evacuated to a pressure below about 0.0005 torr and containing vaporized aluminum. A relatively planar surface of aluminum is deposited over the entire exposed surface of the primer coating 40 at a thickness of between about 10 to 25 nm—measured in terms of electrical resistance—and then converted to light transmissiveness (0.13% to 0.5%) to define a thickness. The aluminum coated facestock 20 can then be rolled back into a "jumbo" roll for storage and transportation prior to application of an adhesive 60.

Pressure Sensitive Adhesive

Pressure-sensitive adhesives 60 suitable for use in the tamper-indicating label 10 of this invention must possess a number of physical and chemical characteristics including (i) an adhesive strength sufficient to prevent unintended peeling of the label 10 from the substrate 100 after prolonged exposure to the forces of nature, (ii) an adhesive strength sufficient to cause the imaged release coating 30 layer to separate from one of the coatings to which it is directly laminated (i.e, the facestock 20, primer coating 40, contrast enhancement coating 50 or adhesive 60) but insufficient to separate the various layers in those areas which were not treated with a release coating 30, and (iii) a relationship between adhesive strength and cohesive strength capable of causing the release coating 30 layer of the label 10 to separate from one of the other layers while remaining attached to the label 10 upon removal from a substrate 100. In addition, the pressure sensitive adhesive 60 should be easily removable from the substrate 100 without the use of solvents or mechanical means in those situations where adhesive transfers to the substrate 100 upon removal of the label 10.

Selection of an optimal adhesive 60 depends upon a number of factors including the composition of the other layers in the label 10 and the particular substrate 100 to which the label 10 is to be applied.

Useful adhesives 60 include specifically, but not exclusively, crosslinked acrylate adhesives, block copolymer adhesives, and rubber resin adhesives.

Rubber resin adhesives 60 include synthetic rubbers, such as polyisoprene; natural rubbers; and synthetic block copolymers. Useful synthetic block copolymers are commercially available from such sources as Shell Chemical Co. and include styrene-isoprene-styrene (such as Kraton™ 1107) and styrene-butadiene-rubber (such as Kraton™ 1657). The rubber resin adhesives 60 may also include solid and/or liquid tackifying resins, antioxidants, fillers and other common rubber additives.

The adhesives 60 may be coated from solvent or compounded as a hot melt adhesive. The compounding and coating of these types of adhesives 60 are known in the art and described in various publications including U.S. Pat. No. 3,239,478 issued to Harlan.

A particularly suitable pressure-sensitive adhesive 60 for application to the various glass, metallic and plastic components of aircraft, automobiles, boats, ships, etc. is a crosslinked copolymer of (a) a hydrophobic acrylate monomer (monomer A), (b) a hydrophilic ethylenically unsaturated monomer (monomer B), and (c) a mono-ethylenically unsaturated crosslinking agent (monomer PX). The PX monomer is preferably a photosensitive crosslinking agent effective for crosslinking the copolymer upon exposure to ultraviolet radiation. Such adhesives 60 are disclosed in U.S. Pat. Nos. Re. 24,906 issued to Ulrich and 4,737,559 issued to Keller, et al, both of which are assigned to the Minnesota Mining and Manufacturing Company of St. Paul, Minn. However, such pressure sensitive adhesives 60 may be modified by excluding chain terminating agents from the polymerization mixture.

The properties and characteristics of the adhesive 60 compositions of this invention are based upon a cooperative interaction of the various individual components. Consequently, efforts to describe the attributes contributed and/or influenced by each of the individual components is not necessarily indicative of the attributes possessed by the final adhesive 60 composition. Such descriptions should therefore be used only as an indication of general trends and as a guide to those attributes which should be carefully considered when selecting the other components of the composition.

Monomer A

Monomer A is a hydrophobic acrylate monomer which contributes to the visco-elastic properties of the copolymer. The monomer is selected from the group consisting of (i) an acrylate or methacrylate ester of a non-tertiary $C_{4-12}$ alcohol, and (ii) an acrylate or methacrylate ester of a mixture of non-tertiary $C_{1-14}$ alcohols with an average of between about 4–12 carbon atoms per alcohol molecule. Useful acrylate and methacrylate alcohol esters include specifically, but not exclusively, the acrylic acid and methacrylic acid esters of 1-butanol, 1-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, and 1-dodecanol.

The copolymer includes about 75 to 98 wt %, preferably about 90 to 95 wt % monomer A based upon the total weight of all monomers in the copolymer.

Monomer B

Monomer B is a reinforcing co-monomer whose homopolymer has a higher glass transition temperature than the homopolymer of monomer A. Examples of co-monomers suitable for use as monomer B include specifically, but not exclusively acrylic acid, n-vinylpyrrolidone, itaconic acid, acrylamide and methacrylamide.

The copolymer includes about 2 to 25 wt %, preferably about 5 to 10 wt % monomer B based upon the total weight of all monomers in the copolymer.

Crosslinking Monomer PX

Crosslinking monomer PX is a copolymerizable, mono-ethylenically unsaturated crosslinkable monomer. The ethylenically unsaturated group is copolymerizable with monomers A and B to form the backbone of the polymer chain. The PX monomer is preferably one which may be crosslinked after coating of the adhesive 60 composition upon a support such as by exposure to ultraviolet radiation or E-beam particles.

A preferred PX monomer is a monoethylenically unsaturated aromatic ketone. Such PX monomers are known to absorb ultraviolet radiation and form a triplet excited state through intersystem crossing. The excited-state molecules abstract hydrogen radicals from the polymer chain leaving free radical sites which combine to form crosslinks. The semi-pinacol radical on the aromatic ketone can also produce crosslinking.

A hydroxyl group positioned ortho to the carbonyl group on the aromatic ring is known to inhibit the ability of aromatic ketones to effect crosslinking. Accordingly, the aromatic ketone monomer should be free of ortho-aromatic hydroxyl groups to be optimally effective as a photosensitive crosslinking agent.

Suitable PX monomers are represented by the general formula:

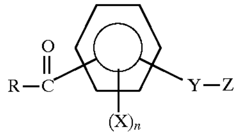

wherein:

R: is a lower alkyl or phenyl which may be substituted with one or more halogen atoms, alkoxy groups or hydroxyl groups except that when R is a hydroxy substituted phenyl the hydroxyl group(s) should be positioned meta or para to the aromatic carbonyl;

X: is halogen, alkoxy or hydroxyl provided that when X is a hydroxyl group it is positioned meta or para to the aromatic carbonyl;

Y: is a divalent linking group which is preferably a covalent bond, an oxygen atom(—O—), an amino group (—$NR^1$— wherein $R^1$ is hydrogen or lower alkyl), an oxyalkyleneoxy group (—O—$R^2$—O— wherein $R^2$ is an alkylene group), a carbamoylalkyleneoxy group (—O—$R^2$—O—(O)—N—($R^1$)—$R^3$— wherein $R^3$ is a covalent bond or an alkyleneoxy group such as —$R^2$—O—);

Z: is alkenyl or ethylenically unsaturated acyl group; and n: is an integer from 0 to 4.

Particularly preferred PX monomers are the acryloxybenzophenones such as 4-acryloxybenzophenone.

The copolymer includes about 0.01 to 2 wt %, preferably about 0.025 to about 0.5 wt % PX monomer based upon the total weight of all monomers in the copolymer. A PX content of less than about 0.025 wt % tends to produce an adhesive 60 with reduced cohesive strength while a PX content of greater than about 2 wt % tends to produce an adhesive 60 with insufficient tack.

The thickness of the pressure sensitive adhesive 60 at which the desired properties and characteristics are optimized depends upon several factors including the specific adhesive 60 employed and the specific substrate 100 to which the label 10 is attached. In general, best performance is achieved at adhesive 60 thicknesses of between about 0.013 mm to 0.13 mm, preferably about 0.023 mm to 0.08 mm. By way of example, we have discovered that a pressure sensitive adhesive 60 thickness of about 0.05 mm provides optimal performance when the adhesive 60 is of the type disclosed above and the substrate 100 is a polymer coated automobile tail light.

A protective release liner 70 may be applied to the pressure sensitive adhesive 60 to protect the adhesive 60 against contamination and prevent the label 10 from bonding to a substrate 100 during transportation, storage, and handling of the label 10. The release liner 70 must adhere to the adhesive 60 with a strength sufficient to prevent accidental removal of the liner but insufficient to predestruct the label 10 during removal of the release liner 70.

Application of Adhesive

The pressure sensitive adhesives 60 can applied to the labelstock by directly coating the adhesive 60 onto the labelstock or coating the adhesive 60 onto a release liner 70 and then laminating the adhesive 60 to the labelstock in a laminator. Suitable release liners 70 include polyester films and papers coated with a release agent such as silicone, epoxysilicone, perfluoropolyether, etc.

An alternative method of applying adhesive 60 to the label 10 is to coat the adhesive 60 onto a release liner to form a transfer tape and then transferring the pressure sensitive adhesive 60 from the transfer tape to the label 10 using standard lamination techniques.

Another alternative method of applying adhesive 60 to the label 10 is to coat the adhesive 60 onto a first side of a carrier web which has been previously coated on the second side with a suitable adhesive to form a double coated tape. The double coated tape can then be laminated to the label 10 with the second side of the double coated tape adhesively bonded to the label 10 so as to expose the adhesive on the first side of the tape for application of the label 10 to a substrate.

Figure 7:
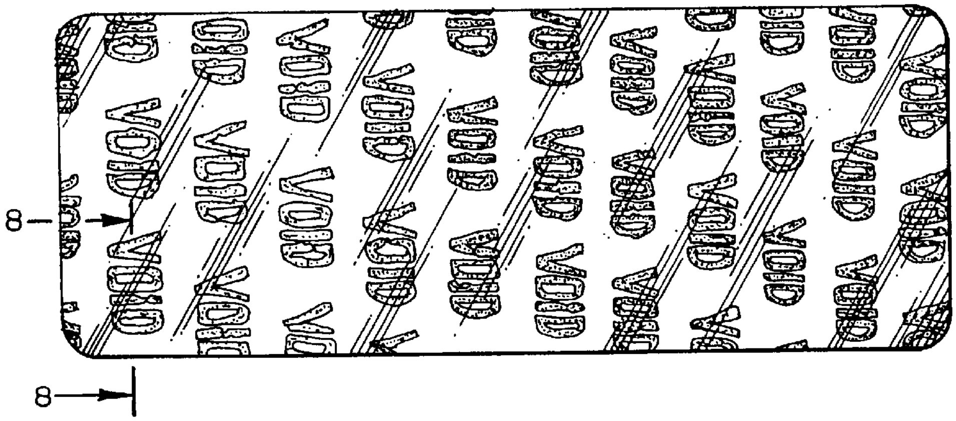
FIG. 7 is a top view of the invention depicted in FIG. 3 after being activated.

FIG. 7 depicts the top view of a label that has been activated and the areas of the contrast enhancement layer, where the release coating is printed with the letters VOID, are permanently distorted.

Figure 8:
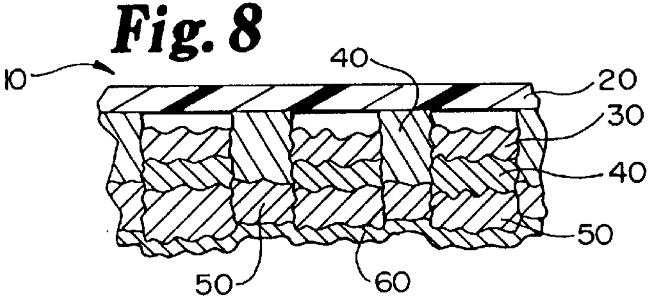
FIG. 8 is a cross-sectional side view of the invention depicted in FIG. 7.

FIG. 8 depicts a cross-sectional side view of FIG. 7 in which the contrast enhancement layer is distorted and broken apart from being pulled by the adhesion force of the pressure sensitive adhesive to the substrate in the areas of the label that have been printed with a release coating. The contrast enhancement layer is no longer planar so light is transmitted through the label in those areas where the contrast enhancement layer has been broken apart while areas without the release coating remain intact and opaque to light. The pressure sensitive adhesive has also undergone an irreversible elastic deformation and is no longer planar.

Figure 9:
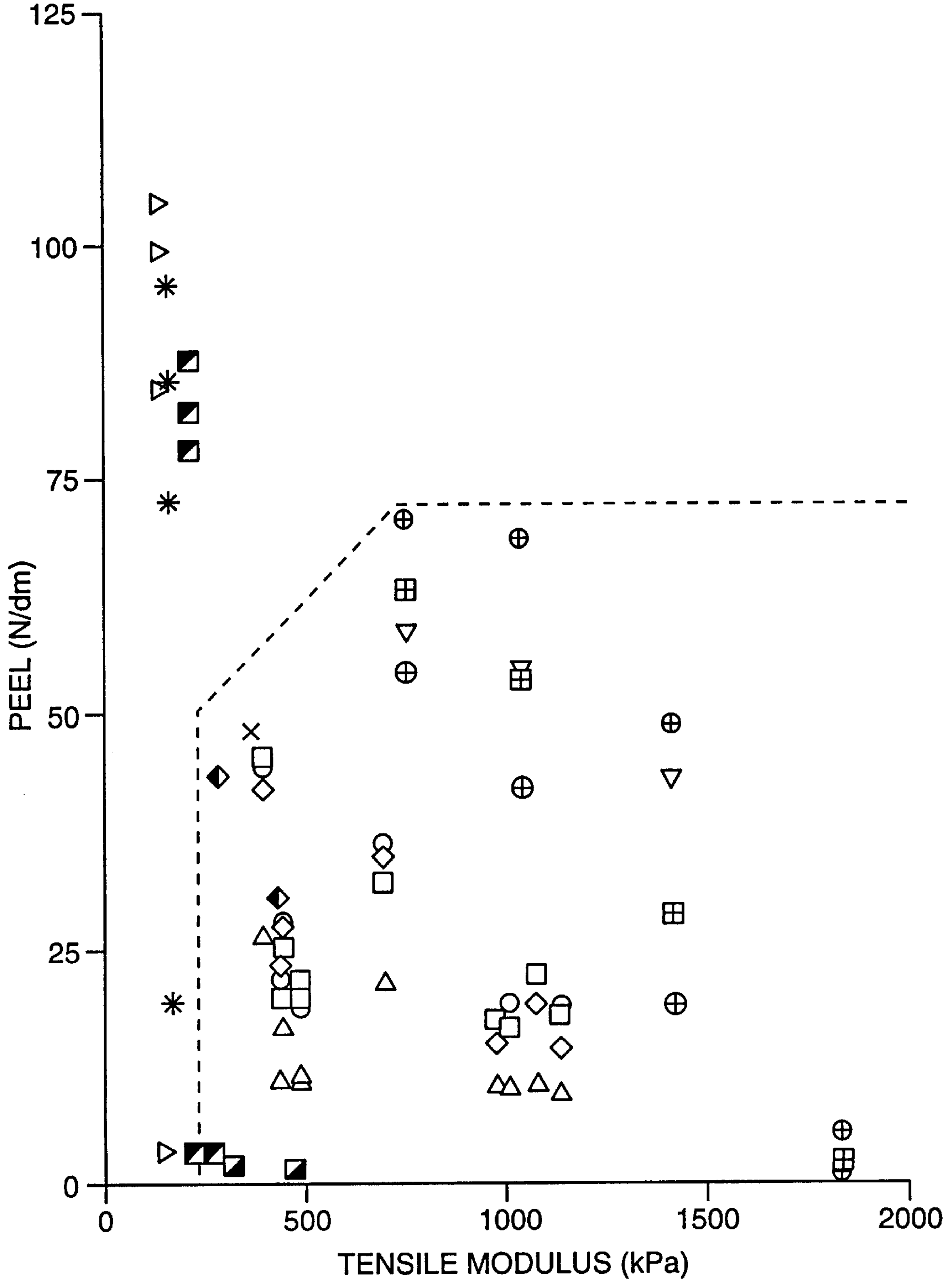
FIG. 9 is a graphical depiction of the Peel Adhesion versus Tensile Modulus relationship for several of the adhesives disclosed in the EXAMPLES section of this specification.

As graphically depicted in FIG. 9, useful pressure sensitive adhesives 60 are those which have (i) a Tensile Modulus of greater than about 200 KPa when the Peel Adhesion is up to 50 N/dm, (ii) a Peel Adhesion of less than about 75 N/dm when the Tensile Modulus is greater than 750 KPa, and (iii) a Peel Adhesion equal to (0.0442).(Tensile Modulus)+(40.85) when Peel Adhesion is between about 50 N/dm and 75 N/dm and Tensile Modulus is between about 200 KPa and 750 KPa. The Peel Adhesion versus Tensile Modulus relationship for several of the adhesives 60 disclosed in the EXAMPLES section of this specification are plotted on FIG. 9. The nomenclature used on FIG. 9 is provided below.

FIG. 9 NOMENCLATURE

| | |
|---|---|
| □ Acrylate-SS | ◇ Acrylate-AI |
| ○ Acrylate-GI | Δ Acrylate-PP |
| ⊞ Kraton-SS | ◈ Kraton-AI |
| ⊕ Kraton-GI | ∇ Kraton-PP |
| ◪ Polyisoprene | ◆ SBR |
| * 967 | ▸ 467 |
| ◩ 965 | ◆ GMS 263-0.75% |
| x GMS 263-1% | |

Superior results can generally be achieved using pressure sensitive adhesives 60 having a tensile modulus greater than about 275 KPa with those having a tensile modulus of greater than about 300 KPa most preferred. In addition, the pressure sensitive adhesive 60 should have a Peel Adhesion value sufficient to activate the label 10 when it is removed but less than about 75 Newtons/decimeter (N/dm), preferably less than about 70 N/dm, and most preferably less than about 65 N/dm when applied to the substrate 100 upon which the label 10 is to be used.

Tensile modulus of the adhesive 60 provides a general measure of the cohesive strength or internal strength of the adhesive 60. The relationship between cohesive strength—measured as Tensile Modulus—and peel strength—measured as Peel Adhesion—should be such that when the label 10 is removed the adhesive 60 has enough cohesive strength to overcome the adhesion force to the substrate 100 and the adhesive 60 removes cleanly from the substrate 100 without the use of a solvent or a scraping tool. Suitable adhesives 60 should possess a peel strength—measured as Peel Adhesion—sufficient to guarantee activation of the label 10 when removed from a substrate 100 and a cohesive strength which exceeds the Peel Adhesion by an amount effective for permitting any residual adhesive 60 left on the substrate 100 after removal of the label 10 to be rubbed cleanly from the substrate 100 without the use of tools or solvents. Preferably, the cohesive strength of the adhesive 60 is effective for overcoming the peel strength and preventing partial transfer of adhesive 60 from the label 10 to the substrate 100.

Adhesives 60 with extreme peel strength (a generally desirable characteristic for pressure sensitive adhesives 60) are generally unacceptable because of the difficult in achieving a suitable relationship between peel strength and cohesive strength because the cohesive strength is usually too low. Similarly, adhesives 60 with a low cohesive strength are generally undesirable because they tend to separate into discrete splotches and leave a residue on the substrate 100.

A low Peel Adhesion may be acceptable when the label 10 is to be used on certain surfaces as long as the necessary Peel Adhesion force and relationship between Peel Adhesion and cohesive strength are achieved and the adhesive 60 keeps the label 10 adhered to the surface until intentionally removed.

The facestock 20 may optionally be printed with visible graphics on either the facestock 20 or the primer coating 40 so long as the graphics does not interfere with the necessary adhesive 60 and cohesive relationships between the various layers. The graphics—when not light transmissive—should be limited so that they do not completely obscure the entire tamper-indicating message. On the other hand—when light transmissive—the graphics may be coextensive with the label 10.

Polymerization Process

Monomers A, B and PX are free radical polymerized to form a precursor composition of this invention which may then be crosslinked to form the adhesive 60.

Emulsion

The A, B and PX monomers may be polymerized in an aqueous emulsion by incorporating a suitable emulsifier for the monomers and the resultant polymer. A wide range of emulsifiers are readily available from a number of suppliers. A fairly extensive list of commercially available emulsifiers is provided in *McCutcheon's: Detergents & Emulsifiers*; North American Edition, Volume I 1993. Selection of a suitable emulsifier(s) for use in the emulsion polymerization of the adhesive polymer is well within the ability of those skilled in the art.

The amount of water used should be sufficient to achieve intimate contact between the polymerization reactants including monomers A, B, and PX as well as the polymerization initiator and initiated polymer chains. Typically, use of about 30–80 wt % water, based on the total weight of reactants and water, is sufficient to achieve substantially complete polymerization within a reasonable time period.

In addition to emulsion polymerization, polymerization of the monomers may be completed by other well known techniques, such as suspension polymerization and bulk polymerization, so long as the desired polymer molecular weight (preferably about 2,000,000 to 3,000,000) can be achieved.

Polymerization Initiator

Polymerization of the emulsified monomers is effected by standard polymerization initiators such as suitable free radical initiators and redox initiators. Numerous free radical and redox initiators are well known in the industry. Exemplary of those initiators suitable for use in the present invention are those described in U.S. Pat. No. Reissue 24,906 issued to Ulrich. Suitable thermally activated initiators include specifically, but not exclusively, azo compounds such as 2,2'-azo-bis(isobutyronitrile), tert-butyl hydroperoxide, benzoyl peroxide, and cyclohexanone peroxide. A suitable redox initiator is a combination of potassium persulfate and sodium bisulfite. Generally, about 0.01 to 1 wt %, preferably about 0.01 to 0.5 wt %, initiator, based upon the total weight of all monomers in the polymer, is effective for initiating polymerization.

Coating and Drying

The adhesive 60 may be (i) coated in its original emulsified state, (ii) dried, redispersed in a suitable solvent and then solvent coated, or (iii) dried and hot-melt coated using commercially available hot-melt coating equipment.

TESTING PROTOCOLS

Peel Adhesion

The Peel Adhesion (PA) of a pressure sensitive adhesive is measured by laminating the adhesive to a 0.051 mm thick polyester film and cutting the adhesive coated film into strips measuring 2.54 cm by 12.7 cm. One of the adhesive strips is then placed into adhesive engagement with one of the panels listed below and pressed onto the panel with a single pass of a two kg roller. No manual pressure is applied to the roller during application.

SS Bright annealed 304 stainless steel measuring 5.08 cm·12.7 cm·18 gauge.

AL Clear anodized aluminum measuring 5.08 cm·12.7 cm·0.16 cm with lengthwise grain purchased from Vincent Metals, Inc. of Minneapolis, Minn.

GL Soda-lime float glass 5.08 cm·12.7 cm·0.64 cm

PP Smooth finish polypropylene measuring 5.08 cm·12.7 cm·0.48 cm purchased from Precision Punch and Plastics of Minneapolis, Minn.

The strip and panel are then conditioned at 21° C. for a defined period. One end of the conditioned panel is then clamped into the lower jaw of a tensile tester (INSTRON Model No. 1122) and an opposite end of the adhesive coated polyester liner is clamped into the upper jaw such that the adhesive coated polyester strip will be pulled from the panel at a 180° angle. The jaws are then separated at a rate of 30 cm per minute and the Peel Adhesion expressed in N/dm and recorded.

Tensile Modulus

The Tensile Modulus (TM) of a pressure sensitive adhesive is measured in accordance with the procedure set forth in ASTM D-882 modified as set forth below. A known thickness of the adhesive is laminated between two release liners and the sample cut into strips measuring 2.54 cm by 12.2 cm. A strip is mounted over a 5.1 cm·10.2 cm rectangular opening in a heavy paper frame by (i) resting the frame on a release liner, (ii) attaching a length of double coated tape (SCOTCH® brand 665 Double Coated Tape) to the frame along the short ends of the opening, (iii) removing one of the release liners from the adhesive sample, (iv) positioning the adhesive sandwich over the opening with the adhesive surface facing the frame and the distal edges adhesively contacting the double coated tape, and (v) pressing the distal edges of the adhesive sandwich into firm engagement against the double coated tape, (vi) carefully removing the remaining release liner from the adhesive sample, with the application of dry ice when necessary to achieve complete satisfactory separation, (vii) applying masking tape over the edges of the adhesive sample contacting the double sided tape, and (viii) removing the frame and attached adhesive from the release liner.

The adhesive sample within the frame is mounted into the jaws of a tensile tester (INSTRON Model No. 1122) with the jaws spaced 10.2 cm apart and positioned so as to clamp only the portions of the frame with the adhesive sample within the jaws. The sides of the frame are then cut so that only the adhesive sample is stretched as the jaws are separated.

The jaws are then separated at a rate of 12.7 cm per minute and the force exerted on the strain gauge measured as a function of time and recorded. The stress exerted upon the adhesive sample is calculated in accordance with equation (1) provided below.

$$\sigma = \frac{\text{(Force)}}{\text{(Sample Width)(Sample Thickness)}}$$

The strain exerted upon the adhesive sample is calculated in accordance with equation (2) provided below.

$$U = \frac{\text{(Jaw Displacement)}}{\text{(Initial Jaw Gap)}}$$

Tensile Modulus is the initial slope of σ/U with values expressed in KiloPascals (KPa). The reported Tensile Modulus is the average of two or three samples.

Label Performance

The performance of a label—measured as a function of activation and adhesive cohesiveness—is measured by (i) applying the label to a smooth glass substrate, (ii) pressing the label down with finger pressure and allowing the label to stabilize for about ten minutes, (iii) peeling about one to two centimeters of each label from the panel, (iv) recording the initial activation and adhesive cohesiveness of the label, (v) conditioning the label for 24 hours at one of the following test conditions:

−30.0° C. (COLD TEMP TEST)

21.0° C. (ROOM TEMP TEST)

65.6° C. (ELEV TEMP TEST)

The remaining portion of the label is then peeled by hand from the glass substrate at about a 90° peel angle with the label and glass substrate maintained at the conditioned temperature.

In addition, various samples conditioned at −30° C. and 65.6° C. were brought to room temperature before the remaining portion of the label was peeled from the glass substrate.

The following performance characteristics were noted and recorded for the tested samples:

DESTRUCT

Yes: The label was activated when peeled from the substrate and the void message visible.

No: The label was not activated when peeled from the substrate and the void message not visible.

VOID TRANSFER

Yes: A portion of the VOID message from the label transferred to the glass plate.

: Approximation of the % of void message transferred from the label to the glass plate.

No: The label was removed as a single unit leaving no residue on the glass plate.

Preferred embodiments are removed as a single unit (No) but labels which leave a residue on the glass plate (## or Yes) are still acceptable embodiments provided the residual adhesive is easily removed as evidenced by the Rub Removal Test.

RUB REMOVAL

Yes: Adhesive or labelstock residue left on the glass plate after complete removal of the label is easily removed by rubbing with a finger at room temperature without smearing.

S: Adhesive or labelstock residue left on the glass plate after complete removal of the label is removed with some difficulty but smeared when rubbed with a finger.

SS: Adhesive or labelstock residue left on the glass plate after complete removal of the label smears significantly when rubbed with a finger and can be removed only with the aid of a scraping tool or a solvent.

EXAMPLE DEFINITIONS

LabelStock (LblStk)

X=SCOTCH® Brand 8071 Tamper Indicating Polyester Film available from Minnesota Mining & Manufacturing Co. of St. Paul, Minn.

Z=SCOTCH® Brand 8074 Tamper Indicating Polyester Film available from Minnesota Mining & Manufacturing Co. of St. Paul, Minn.

EXPERIMENTAL

Preparation of Pressure Sensitive Adhesives (ADH)

Examples A–J and Q1–Q2

Pressure sensitive adhesives were prepared by emulsion polymerization of 94 parts isooctyl acrylate monomer, 6 parts acrylic acid monomer, and 0.4 parts acryloxybenzophenone (supplied as 1.54 parts of a 26% solids by weight solution of acryloxybenzophenone in ethyl acetate) in accordance with the procedure described in Example 5 of U.S. Pat. No. Reissue 24906 issued to Ulrich and assigned to the Minnesota Mining and Manufacturing Company of St. Paul, Minn., except that the chain transfer agent tertiary dodecyl mercaptan was not used. Upon completion of the polymerization process, the emulsion was dried to form a solid pressure sensitive adhesive. The adhesive was then hot melt coated onto a silicone coated transparent polyester release liner to a thickness of 0.025 mm for adhesives A through E and a thickness of 0.051 mm for adhesives F through J. The adhesives were then exposed to medium pressure mercury arc lamps at varying intensities and total energies to crosslink the adhesive. Lamp intensities and total energy were measured using a UVIMAP Model 365HP1 available from EIT in Sterling, Va. The intensity and total energy readings are set forth in TABLE ONE.

Adhesives Q1 (0.025 mm thick) and Q2 (0.051 mm thick) were hot melt coated onto the silicone coated transparent polyester release liner to a thickness of 0.025 mm and 0.051 mm respectively and were not exposed to ultraviolet light.

The adhesives were tested for Tensile Modulus and Peel Adhesion with the results set forth in TABLE ONE.

Label Composition and Performance

Examples 1–20

Tamper indicating labels were constructed as set forth in TABLE TWO by laminating Labelstocks X and Z to the various adhesives described in TABLE ONE. The labels were then tested for label performance according to the testing protocols set forth herein with the test results shown in TABLE TWO. The data represented in TABLES ONE and TWO show that (i) preferred adhesives have adequate cohesive strength (measured as tensile modulus) without excessive Peel Adhesion performance on the various substrates, (ii) crosslinked acrylate adhesives having a moderate cohesive strength (measure as tensile modulus) are suitable for use in the tamper-indicating labels of this invention, and (iii) the labels tested as Examples $16^t$–$20^t$ possess good Destruct and Rub Removal characteristics on plastic at low temperatures.

Examples 16–20 and $C_4$ were also tested on an automotive tail light at cold temperatures where failures in the label would be most likely to occur. Test results are shown in TABLE TWO under example designations $16^t$–$20^t$ and $C4^t$.

Comparative Examples C1–C4

For comparative purposes, tamper indicating labels were constructed as set forth in TABLE TWO by laminating Labelstocks X and Z to adhesives Q1 and Q2 described in TABLE ONE. The labels were then tested for label performance according to the testing protocols set forth herein with the test results shown in TABLE TWO.

Comparative Examples C5–C7

For comparative purposes, tamper indicating labels were constructed as set forth in TABLE TWO by laminating Labelstocks X and Z to commercially available SCOTCH® brand pressure sensitive adhesive transfer tapes obtained from Minnesota Mining and Manufacturing Company of St. Paul, Minn. as set forth below.

Example Q5: 967 SCOTCH® brand PSA transfer tape

Example Q6: 467 SCOTCH® brand PSA transfer tape

Example Q7: 965 SCOTCH® brand PSA transfer tape

The adhesives on these tapes are typical acrylate adhesives which have a low tensile modulus and high tack. The labels were then tested for label performance according to the testing protocols set forth herein with the test results shown in TABLE TWO.

Adhesive Composition and Performance

Pressure sensitive adhesives were prepared by dissolving a base polymer in toluene on a shaker table with the optional addition of a tackifying resin or catalyst. The adhesive compositions of Examples 21–24, 29–36 and 45 had a solids contents of 30 wt % while Examples 25–28 and 37–44 had a solids contents of 10 wt %. The amounts of base polymer, tackifying resin and catalyst incorporated into the various adhesive compositions are set forth in TABLE THREE.

The adhesives were coated to a dry thickness of 0.025 mm and 0.051 on Facestock Z for use in testing the Peel Adhesion and label performance of the adhesive.

The base polymers, tackifying resins and catalysts used in formulation of the adhesives are set forth below:

| Examples | Polymer Base | Tackifier |
|---|---|---|
| 21–24 | Kraton ™ 1107 Styrene-Isoprene-Styrene available from Shell Chemical Company | Escorez ™ 1310LC available from Exxon Chemical Company |
| 25–27 | Natsyn ™ 2200 Polyisoprene available from The Goodyear Tire & Rubber Company | Escorez ™ 1310LC available from Exxon Chemical Company |
| 28 | Ameripol ™ 1011A Styrene-Butadiene rubber available from B. F. Goodrich Company | None |

-continued

| Examples | Polymer Base | Tackifier |
|---|---|---|
| 29–36 | Kraton ™ 1107 Styrene-Isoprene-Styrene available from Shell Chemical Company | Escorez ™ 1310LC available from Exxon Chemical Company |
| 37–39 | Kraton ™ G1657 Styrene-Ethylene-Butylene-Styrene available from Shell Chemical Company | Wingtack Plus ™ available from Firestone |
| 40–41 | Ameripol ™ 1011A Styrene-Butadiene rubber available from B. F. Goodrich Company | FORAL ™ 85 available from Hercules, Inc. |
| 42–44 | Natsyn ™ 2200 Polyisoprene available from The Goodyear Tire & Rubber Company | Escorez ™ 1310LC available from Exxon Chemical Company |
| 45 | Kraton ™ 1107 Styrene-Isoprene-Styrene available from Shell Chemical Company | Wingtack Plus ™ available from Firestone |
| 101–104 | Gelva GMS ™ 263 available from Monsanto. | DABCO ™ 33-LV (catalyst) available from Air Products. |

Test results are set forth in TABLE FOUR.

The data represented in tables three and four demonstrate that a variety of adhesives can provide the necessary characteristics required for the tamper-indicating label of this invention.

Reasonable variations and modifications are possible within the scope of the foregoing specification and drawings without departing from the invention which is defined in the accompanying claims.

TABLE ONE

Adhesive Compositions
Adhesive and Label Performance

| Adhesive | Lamp Intensity ($Mw/cm^2$) | Total Energy ($mJ\backslash cm^2$) | Modulus (KPa) | Peel Adhesion - N/dm (Conditioned 24 hrs) SS | AL | GL | PP | Label Performance[1] |
|---|---|---|---|---|---|---|---|---|
| A | 224 | 73.1 | 979 | 18.0 | 15.3 | 17.7 | 10.9 | GOOD |
| B | 226 | 78.8 | 1140 | 18.4 | 14.8 | 19.5 | 10.1 | GOOD |
| C | 172 | 66.0 | 1010 | 17.1 | 17.1 | 19.6 | 10.8 | GOOD |
| D | 168 | 47.8 | 1080 | 22.8 | 19.6 | 23.0 | 11.2 | GOOD |
| E | 78 | 15.9 | 696 | 32.5 | 35.2 | 36.6 | 22.1 | GOOD |
| F | 218 | 55.3 | 476 | 20.2 | 19.9 | 19.8 | 11.3 | GOOD |
| G | 214 | 47.7 | 476 | 21.9 | 22.8 | 18.9 | 11.8 | GOOD |
| H | 164 | 39.6 | 427 | 19.9 | 23.3 | 21.9 | 11.3 | GOOD |
| I | 158 | 29.2 | 434 | 25.6 | 27.3 | 27.6 | 17.0 | OK |
| J | 72 | 9.2 | 386 | 45.6 | 42.2 | 44.2 | 26.9 | OK |
| Q1 | NONE | NONE | —[2] | — | — | — | — | POOR |
| Q2 | NONE | NONE | —[2] | — | — | — | — | POOR |
| c5 | — | — | 152 | 95.6 | 72.6 | 85.2 | 19.5 | FAIL |
| C6 | — | — | 138 | 104.4 | 99.3 | 94.5 | 3.6 | FAIL |
| C7 | — | — | 207 | 87.5 | 82.0 | 78.1 | 3.5 | FAIL |

[1]Label performance was judged on a summary of the data in Table 2. Examples C1–C3 failed the room temperature tests and were not tested any further.
[2]The adhesives were too soft to prepare a usable sample. Tensile modulus is below 138 Kpa.

TABLE TWO

Label Performance

| Example | Label Construction | | Cold Temp Test | | | | | Room Temp Test | | | Elevated Temp Test | | | | |
|---|---|---|---|---|---|---|---|---|---|---|---|---|---|---|---|
| # | Lb1Stk | Adh | CTD | CTV | RTD | RTV | RTR | RTD | RTV | RTR | ETD | ETV | RTD | RTV | RTR |
| 1 | X | A | Y | N | Y | N | Y | Y | N | Y | Y | 50 | Y | 10 | Y |
| 2 | X | B | Y | Y | Y | N | Y | Y | N | Y | Y | 30 | Y | 70 | Y |
| 3 | X | C | Y | Y | Y | N | Y | Y | N | Y | Y | 20 | Y | 100 | Y |
| 4 | X | D | Y | 10 | Y | N | Y | Y | 50 | SS | Y | 100 | Y | 60 | Y |
| 5 | X | E | Y | 50 | Y | Y | Y | Y | 100 | S | Y | 100 | Y | 100 | SS |
| C1 | X | Q[1] | Y | Y | Y | Y | SS | Y | 100 | S | Y | 100 | Y | 100 | SS |
| 6 | X | F | Y | 40 | Y | N | Y | Y | N | Y | Y | N | Y | N | Y |
| 7 | X | G | Y | N | Y | N | Y | Y | N | Y | Y | N | Y | N | Y |
| 8 | X | H | Y | 30 | Y | N | Y | Y | N | Y | Y | N | Y | N | Y |
| 9 | X | I | Y | Y | Y | N | Y | Y | N | Y | Y | N | Y | N | Y |
| 10 | X | J | Y | N | Y | N | Y | Y | N | Y | Y | 100 | Y | N | SS |
| C2 | X | Q[1] | Y | Y | Y | N | SS | Y | 90 | S | Y | 35 | Y | 40 | SS |
| 11 | Z | A | Y | Y | Y | N | Y | Y | N | Y | Y | 100 | Y | 100 | Y |
| 12 | Z | B | Y | Y | Y | N | Y | Y | N | Y | Y | 100 | Y | 100 | Y |
| 13 | Z | C | Y | Y | Y | N | Y | Y | N | Y | Y | 100 | Y | 100 | Y |
| 14 | Z | D | Y | Y | Y | N | Y | Y | N | Y | Y | 100 | Y | 100 | Y |
| 15 | Z | E | Y | Y | Y | Y | S | Y | 100 | S | Y | 100 | Y | 100 | Y |
| C3 | Z | Q[2] | Y | Y | Y | Y | SS | Y | 100 | S | Y | 100 | Y | 100 | SS |
| 16 | Z | F | Y | Y | Y | N | Y | Y | N | Y | Y | N | Y | N | Y |
| 17 | Z | G | Y | Y | N | Y | Y | Y | N | Y | Y | N | Y | N | Y |
| 18 | Z | H | Y | Y | Y | N | Y | Y | N | Y | Y | N | Y | N | Y |
| 19 | Z | I | Y | Y | Y | N | Y | Y | N | Y | Y | N | Y | N | Y |
| 20 | Z | J | Y | Y | Y | 15 | Y | Y | Y | SS | Y | 100 | Y | 100 | SS |
| C4 | Z | Q[2] | Y | Y | Y | Y | SS | Y | 100 | S | Y | 100 | Y | 100 | SS |
| 16' | Z | F | Y | 100 | Y | N | Y | — | — | — | — | — | — | — | — |
| 17' | Z | G | Y | 100 | Y | N | Y | — | — | — | — | — | — | — | — |
| 18' | Z | H | Y | 100 | Y | N | Y | — | — | — | — | — | — | — | |
| 19' | Z | I | Y | 100 | Y | 50 | S | — | — | — | — | — | — | — | — |
| 20' | Z | I | Y | 100 | Y | 100 | SS | — | — | — | — | — | — | — | — |
| C4' | Z | Q2 | Y | 100 | Y | 100 | SS | — | — | — | — | — | — | — | — |
| C5 | Z | Q5 | — | — | — | — | — | Y | 100 | SS | — | — | — | — | — |
| C6 | Z | Q6 | — | — | — | — | — | Y | 100 | SS | — | — | — | — | — |
| C7 | Z | Q7 | — | — | — | — | — | Y | 100 | SS | — | — | — | — | — |

CTD — cold temperature destruct
CTV — cold temperature void transfer
RTD — room temperature destruct
RTV — room temperature void transfer
RTR — room temperature rub removal
ETD — elevated temperature destruct
ETV — elevated temperature void transfer

TABLE THREE

Adhesive Compositions
Adhesive and Label Performance

| Adhesive | Base (Parts) | Tackifier (Parts) | Modulus (Kpa) | Peel Adhesion - N/dm (conditioned 10 min) SS | AL | GL | PP | Label Performance[1] |
|---|---|---|---|---|---|---|---|---|
| 21 | 100 | 0 | 1850 | 1.99 | 0.63 | 6.0 | — | GOOD |
| 22 | 90 | 10 | 1430 | 29.4 | 19.6 | 49.0 | — | GOOD |
| 23 | 80 | 20 | 1050 | 53.7 | 42.4 | 68.8 | — | GOOD |
| 24 | 70 | 30 | 758 | 63.4 | 54.4 | 70.7 | — | GOOD |
| 25 | 100 | 0 | 462 | — | — | 1.4 | — | OKAY |
| 26 | 90 | 10 | 290 | — | — | 2.1 | — | GOOD |
| 27 | 80 | 20 | 241 | — | — | 3.5 | — | GOOD |
| 28 | 100 | 0 | 420 | — | — | 30.9 | — | GOOD |
| 101[4] | 100 | 0 | 360 | — | — | 48.2 | — | GOOD |
| 102[4] | 100 | 0 | 263 | — | — | 43.5 | — | GOOD |

[4]Adhesion cured with 1 wt % (103) and 0.75 wt % (104) DABCO 33-LV catalyst.

TABLE FOUR

| Example # | ADHESIVE Base (Parts) | Tackifier (Parts) | Thickness (mm) | Label Performance[3] Cold Temp Test CTD | CTV | RTR | Room Temp Test RTD | RTV | RTR | Elev Temp Test ETD | ETV | RTR |
|---|---|---|---|---|---|---|---|---|---|---|---|---|
| 29 | 100 | 0 | 0.025 | Y | N | Y | Y | N | Y | Y | 100 | Y |
| 30 | 90 | 10 | 0.025 | Y | N | Y | Y | 100 | Y | Y | 80 | S |
| 31 | 80 | 20 | 0.025 | Y | N | Y | Y | N | Y | Y | 40 | SS |
| 32 | 70 | 30 | 0.025 | Y | 5 | Y | Y | 100 | Y | Y | 20 | SS |
| 33 | 100 | 0 | 0.051 | Y | N | Y | Y | N | Y | Y | 100 | Y |
| 34 | 90 | 10 | 0.051 | Y | N | Y | Y | N | Y | Y | 100 | Y |
| 35 | 80 | 20 | 0.051 | Y | N | Y | Y | N | Y | Y | N | Y |
| 36 | 70 | 30 | 0.051 | Y | 50 | Y | Y | N | Y | Y | N | Y |
| 37 | 95 | 5 | 0.025 | Y | 100 | Y | Y | N | Y | Y | 100 | Y |
| 38 | 90 | 10 | 0.025 | Y | 100 | Y | Y | 100 | Y | Y | 100 | S |
| 39 | 85 | 15 | 0.025 | N | N | Y | Y | 100 | Y | Y | 100 | SS |
| 40 | 100 | 0 | 0.025 | Y | 100 | SS | Y | 100 | SS | Y | 20 | SS |
| 41 | 90 | 10 | 0.025 | Y | 100 | SS | Y | 100 | SS | Y | 80 | Y |
| 42 | 100 | 0 | 0.025 | Y | N | Y | N | N | Y | N | N | Y |
| 43 | 90 | 10 | 0.025 | Y | 40 | Y | N | N | Y | N | N | Y |
| 44 | 80 | 20 | 0.025 | Y | 100 | Y | N | N | Y | Y | 80 | Y |
| 45 | 80 | 20 | 0.025 | Y | 100 | Y | Y | 100 | Y | Y | 100 | S |
| 103[4] | 100 | 0 | 0.023 | Y | 100 | Y | Y | N | Y | Y | N | Y |
| 104[4] | 100 | 0 | 0.020 | Y | 95 | Y | Y | S | Y | Y | N | Y |

[3]Label performance was tested in accordance with the procedure described herein except that the "Cold Temperature Test" was conducted at −28.9° C. with a 4 hour dwell time and the "Elevated Temperature Test" was conducted with a four hour dwell time at 48.9° C. All tests were conducted on a tail light from a Ford Crown Victoria automobile.
[4]Adhesive cured with 1 wt % (103) and 0.75 wt % (104) DABCO 33-LV catalyst.
NOTE: CTD, CTV, etc., designations defined under Table Two

We claim:

1. A tamper-indicating label for application to a substrate, the label having an assembly cohesive strength and comprising sequential layers of:

(a) a light-transmissive facestock;

(b) an imaged release coating providing indicia on the label, said indicia being substantially invisible to the unaided eye until becoming permanently visible to the unaided eye when the release coating is separated from at least one of the other layers of the label; and (c) adhesive means for bonding the label to the substrate with an adhesive strength, said adhesive strength being less than the assembly cohesive strength of the label, to permit the label to be removed from the substrate without residual label fragments remaining on the substrate, and to keep the label together as a single unit after activation of the label.

2. A tamper-indicating label for application to a substrate, the label having an assembly cohesive strength and comprising sequential layers of:

(a) a light-transmissive facestock having first and second major surfaces, (b) an imaged release coating covering less than the entire area of the second major surface of the facestock for providing a message, the release coating being substantially invisible to the unaided eye until becoming permanently visible to the unaided eye when the release coating is separated from at least one of the other layers of the label, (c) a contrast enhancement coating covering the release coating and contacting the second major surface of the facestock in those areas void of release coating, wherein the adhesive strength between the facestock and the release coating is less than the adhesive strength between the facestock and the contrast enhancement coating, and (d) pressure sensitive adhesive means for bonding the label to the substrate with a first adhesive strength, said first adhesive strength being greater than the adhesive strength between the facestock and the release coating, to permit the label to be removed from the substrate while separating the release coating from the facestock to activate the label, and to keep the label together as a single unit after activation without residual label fragments remaining on the substrate.

3. The tamper-indicating label of claim 1 further comprising a contrast enhancement coating between the release coating and the adhesive effective for increasing visual perceptibility of the indicia when the facestock is separated from the release coating.

4. The tamper-indicating label of claim 3 further comprising a light transmissive primer coating between the release coating and the contrast enhancement coating forming a relatively continuous planar surface over the release coated second major surface of the facestock.

5. The tamper-indicating label of claim 4 wherein the primer coating covers the release coating and contracts the facestock in those areas void of release coating and thereby prevents contact of the release coating by contrast enhancement coating.

6. The tamper-indicating label of claim 5 further comprising a removable release liner protectively covering the adhesive which may be removed without activating the label.

7. The tamper-indicating label of claim 2 further comprising a removable release liner protectively covering the adhesive which may be removed without activating the label.

8. The tamper-indicating label of claim 3 wherein the release coating covers about 20 to about 70% of the surface area on the second major surface of the facestock.

9. The tamper-indicating label of claim 2 wherein the release coating covers about 20 to about 50% of the surface area on the second major surface of the facestock.

10. The tamper-indicating label of claim 3 wherein the release coating is a polyvinyl alcohol.

11. The tamper-indicating label of claim 2 wherein the release coating is a polyvinyl alcohol.

12. The tamper-indicating label of claim 3 wherein the contrast enhancement coating is a frangible layer of metal.

13. The tamper-indicating label of claim 3 wherein the contrast enhancement coating is a vapor deposited frangible layer of aluminum about 10 to 25 nm in thickness.

14. The tamper-indicating label of claim 2 wherein the contrast enhancement coating is a vapor deposited frangible layer of aluminum about 10 to 25 nm in thickness.

15. The tamper-indicating label of claim 3 wherein the adhesive is a pressure-sensitive adhesive.

16. The tamper-indicating label of claim 2 wherein the adhesive is a pressure-sensitive adhesive.

17. The tamper-indicating label of claim 15 wherein the adhesive is a pressure-sensitive adhesive comprising a crosslinked copolymer of A, B and PX wherein:

(a) A is an acrylate monomer selected from the group consisting of (i) an acrylate or methacrylate ester of a non-tertiary $C_{4-12}$ alcohol, and (ii) an acrylate or methacrylate ester of a mixture of non-tertiary $C_{1-14}$ alcohols with a resultant average of between about 4–12 carbon atoms per alcohol molecule;

(b) B is acrylic acid; and (c) PX is a crosslinking agent effective for crosslinking the copolymer.

18. The tamper-indicating label of claim 2 wherein the adhesive is a pressure-sensitive adhesive comprising a crosslinked copolymer of about 93 to 96 wt % monomer A, about 4 to 7 wt % monomer B, and about 0.01 to 2 wt % crosslinking monomer PX wherein:

(a) A is an acrylate monomer selected from the group consisting of (i) an acrylate or methacrylate ester of a non-tertiary $C_{4-12}$ alcohol, and (ii) an acrylate or methacrylate ester of a mixture of non-tertiary $C_{1-14}$ alcohols with a resultant average of between about 4–12 carbon atoms per alcohol molecule;

(b) B is acrylic acid; and (c) PX is a crosslinking agent effective for crosslinking the copolymer.

19. The tamper-indicating label of claim 15 wherein the pressure-sensitive adhesive wherein the Tensile Modulus versus Peel Adhesion characteristics of the adhesive provide (i) a Tensile Modulus of greater than about 20 KPa when the Peel Adhesion is 0 to 50 N/dm, (ii) a Peel Adhesion of less than about 75 N/dm when the Tensile Modulus is greater than 750 KPa, and (iii) a Peel Adhesion equal to (0.0442). (Tensile Modulus)+(40.85) when Peel Adhesion is between about 50 N/dm and 75 N/dm and Tensile Modulus is between about 200 KPa and 750 KPa.

20. The tamper-indicating label of claim 1, wherein the label removes from the substrate without leaving any visually perceptible portions of the label on the substrate.

21. The tamper-indicating label of claim 2, wherein the label removes from the substrate without leaving any visually perceptible portions of the label on the substrate.

22. A tamper-indicating label system, comprising:

(a) a substrate; and (b) a tamper-indicating label having an assembly cohesive strength and comprising sequential layers of:

(i) a light-transmissive facestock;

(ii) an imaged release coating providing indicia on the label, said indicia being substantially invisible to the unaided eye until becoming permanently visible to the unaided eye when the release coating is separated from at least one of the other layers of the label; and (iii) an adhesive coating layer bonding the label to the substrate with an adhesive strength, said adhesive strength being less than the assembly cohesive strength of the label, to permit the label to be removed from the substrate without residual label fragments remaining on the substrate, and to keep the label together as a single unit after activation of the label.

23. The tamper-indicating label system of claim 22, wherein said substrate comprises two adjacent panels of a container, at least one of said panels moveable relative to the other, and the label is applied to both panels.

24. The tamper-indicating label system of claim 23, wherein the container is an automobile trunk, one panel is the trunk lid, the second panel is a rear taillight.

25. A tamper-indicating label system, comprising (a) a substrate; and (b) a tamper-indicating label for application to the substrate, the label having an assembly cohesive strength and comprising sequential layers of:

(i) a light-transmissive facestock having first and second major surfaces, (ii) an imaged release coating covering less than the entire area of the second major surface of the facestock for providing a message, the release coating being substantially invisible to the unaided eye until becoming permanently visible to the unaided eye when the release coating is separated from at least one of the other layers of the label, (iii) a contrast enhancement coating covering the release coating and contacting the second major surface of the facestock in those areas void of release coating, wherein the adhesive strength between the facestock and the release coating is less than the adhesive strength between the facestock and the contrast enhancement coating, and (iv) pressure sensitive adhesive means for bonding the label to the substrate with a first adhesive strength, said first adhesive strength being greater than the adhesive strength between the facestock and the release coating to permit the label to be removed from the substrate, and to keep the label together as a single unit after activation without residual label fragments remaining on the substrate while separating the release coating from the facestock to activate the label.

26. The tamper-indicating label system of claim 25, wherein said substrate comprises two adjacent panels of a container, at least one of said panels moveable relative to the other, and the label is applied to both panels.

27. The tamper-indicating label system of claim 26, wherein the container is an automobile trunk, one panel is the trunk lid, the second panel is a rear taillight.

28. A tamper-indicative label changeable from a first state to a second state, the label having an assembly cohesive strength and comprising sequential layers of:

(a) a light-transmissive facestock;

(b) an imaged release coating providing indicia on the label, (c) adhesive means for bonding the label to the substrate with an adhesive strength, said adhesive strength being less than the assembly cohesive strength of the label, wherein in said first state the label is adhered to a substrate and said indicia is substantially invisible to the unaided eye, and in said second state the label is removed from the substrate while the facestock is separated from the release coating to render the indicia permanently visible to the unaided eye, keeping the label together as a single unit after activation without residual label fragments remaining on the substrate.

* * * * *

UNITED STATES PATENT AND TRADEMARK OFFICE

CERTIFICATE OF CORRECTION

PATENT NO. : 5,770,283

DATED : 6/23/98

INVENTOR(S) : Gosselin et al.

It is certified that error appears in the above-identified patent and that said Letters Patent is hereby corrected as shown below:

Column 21, line 47, delete "20" and insert --200--.

Signed and Sealed this

Sixteenth Day of February, 1999

Attest:

Q. Todd Dickinson

Attesting Officer

*Acting Commissioner of Patents and Trademarks*

UNITED STATES PATENT AND TRADEMARK OFFICE

CERTIFICATE OF CORRECTION

PATENT NO. : 5,770,283

DATED : June 23, 1998

INVENTOR(S) : Raymond R. Gosselin and John A. Spevacek

It is certified that error appears in the above-indentified patent and that said Letters Patent is hereby corrected as shown below:

Title Page [56] References Cited - U.S. Patent Documents insert --5,062,928 11/1991 Smith--

--5,135,262 8/1992 Smith et al.--

--5,149,386 9/1992 Smits et al.--

--5,282,650 2/1994 Smith et al.--.

Title Page under the heading "Attorney, Agent or Firm" the first attorney should read --Peter L. Olson--.

Col. 10, line 63, "difficult" should read --difficulty--.

Col. 17, In Table Two for Example 17 under the heading "Cold Temp Test" in the column marked "RTD "N" should read --Y-- and under the column marked "RTV" "Y" should read --N--.

Col. 19/20, in Table Four for Example 30 under the heading "Room Temp Test" in the column marked "RTV" "100" should read --N-- and under the heading "Elev Temp Test" in the column marked "ETV" "80" should read --40--.

UNITED STATES PATENT AND TRADEMARK OFFICE

CERTIFICATE OF CORRECTION

PATENT NO. : 5,770,283

DATED : June 23, 1998

INVENTOR(S) : Raymond R. Gosselin and John A. Spevacek

It is certified that error appears in the above-indentified patent and that said Letters Patent is hereby corrected as shown below:

Col. 19/20, in Table Four for Example 31 under the heading "Room Temp Test" in the column marked "RTV" "N" should read --100-- and under the heading "Elev Temp Test" in the column marked "ETV" "40" should read --80--.

Col. 22, line 43, after "coating" insert --,--.

Signed and Sealed this

Fourth Day of January, 2000

*Attest:*

Q. Todd Dickinson

*Attesting Officer*

*Acting Commissioner of Patents and Trademarks*

UNITED STATES PATENT AND TRADEMARK OFFICE
CERTIFICATE OF CORRECTION

PATENT NO. : 5,770,283
DATED : June 23, 1998
INVENTOR(S) : Raymond R. Gosselin and John A. Spevacek It is certified that error appears in the above-indentified patent and that said Letters Patent is hereby corrected as shown below:

Col. 17, in Table Two (continued) for Example 20' under the heading "Label Construction" in the column marked "Adh" "I" should read --J--.

Signed and Sealed this

Twenty-eighth Day of March, 2000

Attest:

Q. TODD DICKINSON

*Attesting Officer* *Commissioner of Patents and Trademarks*